United States Patent
Chang et al.

(10) Patent No.: US 7,423,651 B2
(45) Date of Patent: Sep. 9, 2008

(54) SINGLE-CHIP MULTI-OUTPUT GRAPHIC SYSTEM

(75) Inventors: Jung-Che Chang, Hsinchu (TW); Tai-Cheng Wang, Hsinchu (TW)

(73) Assignee: V. R. Technology Co., Ltd., Hsinchu (TW)

( * ) Notice: Subject to any disclaimer, the term of this patent is extended or adjusted under 35 U.S.C. 154(b) by 327 days.

(21) Appl. No.: 11/249,672

(22) Filed: Oct. 13, 2005

(65) Prior Publication Data
US 2007/0085852 A1    Apr. 19, 2007

(51) Int. Cl.
*G09G 5/00*    (2006.01)
*G09G 5/02*    (2006.01)
*G06F 13/14*   (2006.01)

(52) U.S. Cl. .................. 345/519; 345/1.1; 345/589; 345/581; 345/629

(58) Field of Classification Search ........... 345/1.1–1.3, 345/2.2, 501–506, 519, 629–630, 589, 597, 345/619, 600; 382/162, 167, 164–165; 358/518–519
See application file for complete search history.

(56) References Cited

U.S. PATENT DOCUMENTS

| | | | | |
|---|---|---|---|---|
| 5,825,775 A | * | 10/1998 | Chin et al. | 370/401 |
| 7,222,355 B2 | * | 5/2007 | Meddaugh et al. | 725/82 |
| 2004/0193449 A1 | * | 9/2004 | Wildman et al. | 705/2 |
| 2006/0279577 A1 | * | 12/2006 | Bakalash et al. | 345/502 |

* cited by examiner

*Primary Examiner*—Wesner Sajous

(57) ABSTRACT

The present invention provides a single-chip but multi-output graphic system which provides identical or different graphic images on two display screens. The graphic system comprises at least a multimedia database, a first input process router, a second input process router, a first graphic processing unit and a second graphic processing unit. The first input process router selects the backdrop graphics and the moving object graphics (which are both provided by the multimedia database), feeds them into the first graphic processing unit and then outputs the processed graphics onto either the first display unit or the second display unit. Similarly, the second graphic processing units processes the backdrop graphics and the moving object graphics selected by the second input process router and then outputs the process graphics onto either the first display unit or the second display unit.

7 Claims, 3 Drawing Sheets

SINGLE-CHIP MULTI-OUTPUT GRAPHIC SYSTEM

FIELD OF THE INVENTION

The present invention generally relates to a graphics processing system, and more specifically to a single-chip multi-output graphic system.

BACKGROUND OF THE INVENTION

Nintendo Dual Screen (NDS) is a new generation handheld game device introduced by the Nintendo Japan Co. Ltd. The main feature of this new product is its dual display facilities. With the advantage of the dual displays, game manufactures can thus provide more exciting varieties of games with improved convenience.

Taking a racing car game as an example, with the dual screen capability, one display can be used for the 3-D backdrops with the player's racing car; while the other display can show a map with the player's racing car position indicated. This provides players the dual views with not only the vivid 3-D gaming scenes, but also the wider and clearer perspective of the map for car racing.

FIG. 1 is a schematic view of a conventional graphic system. Referring to FIG. 1, according to the associated "display rule", via a graphic chip 12, the conventional graphic system provides the graphics of the game backdrops overlaid with the player controlled moving racing car graphics (both are provided by the multimedia database 10) and displays on the screen of a first display device 16. Simultaneously, the graphic display system also provides another graphics of a map for car racing with the position of the racing car indicated on the screen of a second display device 17 via another graphic chip 13. Alternatively, the graphics displayed on the first display device 16 and the second display device 17 can be identical via a single graphic chip 12. With the need for two graphic chips, this conventional display mechanism although accomplishes the hardware requirement for NDS, is always hard to reduce its manufacturing cost.

SUMMARY OF THE INVENTION

The present invention provides a single-chip multi-output graphic system. This single chip graphic system includes two sets of graphic processing units. By adding controls for input signal process routing as well as output signal routing, either identical or different graphics can be displayed on multiple displays. This thus accomplishes the same multi-output graphic capability but with only single graphic chip.

The present invention providing a graphic system with single-chip but multiple outputs for either identical or different graphics on dual screens, comprises at least a multimedia database, a first input process router, a second input process router, a first graphic processing unit, a second graphic processing unit. According to the selection from the first input process router, the first graphic processing unit processes the backdrop graphics and the moving object graphics, provided by the multimedia database, and produces the output graphics for either the first display unit or the second display unit. Similarly, the second graphic processing unit, according to the selection from the second input process router, processes the backdrop graphics and the moving object graphics, provided by the multimedia database, and then produces the output graphics for either the first display unit or the second display unit.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 1:
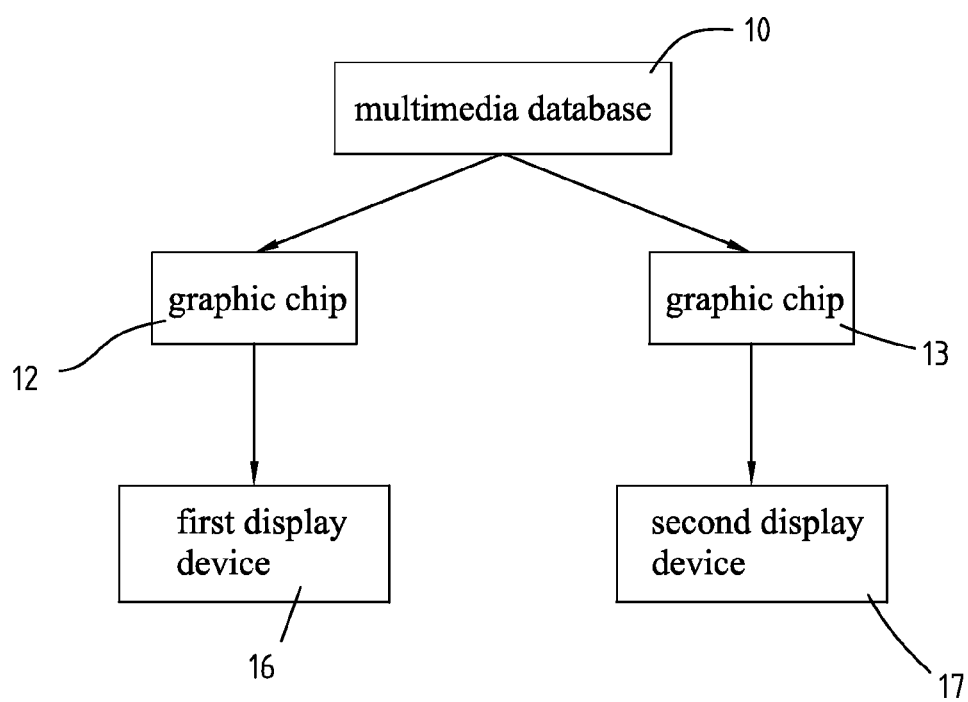
FIG. 1 shows a schematic view of a conventional graphic system.
Figure 2:
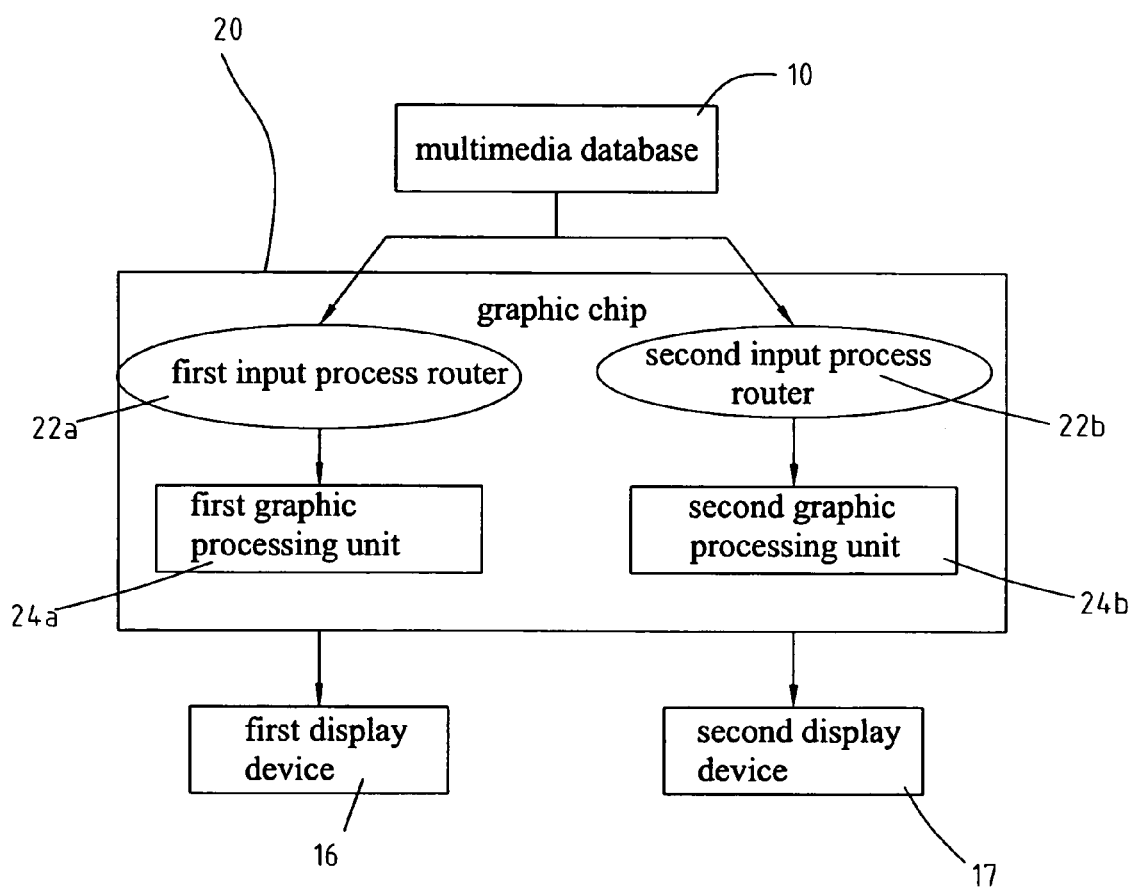
FIG. 2 shows a schematic view of the present invention based on a single-chip but multiple outputs.

FIG. 2 shows a schematic view of a single-chip multi-output graphic system with the present invention. Referring to FIG. 2, a single graphic chip 20 includes two sets of graphic processing units, a first graphic processing unit 24a and a second graphic processing unit 24b. When the input signal of the graphic chip 20 feeds into a first input process router 22a and a second input process router 22b, according to display rule, specific backdrop graphics and the moving object graphics are selected from the multimedia database 10. These sets of graphics is processed by the first graphic processing unit 24a and the second graphic processing unit 24b and are fed into either the first display device 16 or the second display device 17.

For example, when a player starts a racing car game, if the player selects to display on the first display device 16 with the game backdrop and the racing car graphics controlled by the player, and on the second display device 17 with the racing car map showing the position of the player's racing car. The single-chip multi-output graphic system with the present invention will pick up the graphics for the game backdrop and the moving object graphics for the racing car according to a display rule (for example: the movement of the racing car is controlled via the joystick, and the information regarding the graphics of the moving racing car etc) from the multimedia database 10, and feed them into the first input process router of 22a. Both graphics are further processed by the first graphic processing unit 24a and then exported onto the first display device 16. Similarly, the single-chip multi-output graphic system with the present invention can also pick up the information, from the multimedia database 10, about the graphics of the car racing map as the backdrop, and the simplified racing car graphics for the moving object according to the display rule (for example: information about the position of the racing car), and feed them into the second input process router 22b. After the selection of 22b, both graphics are further processed by the second graphic processing unit 24b and then exported onto the second display device 17.

Figure 3:
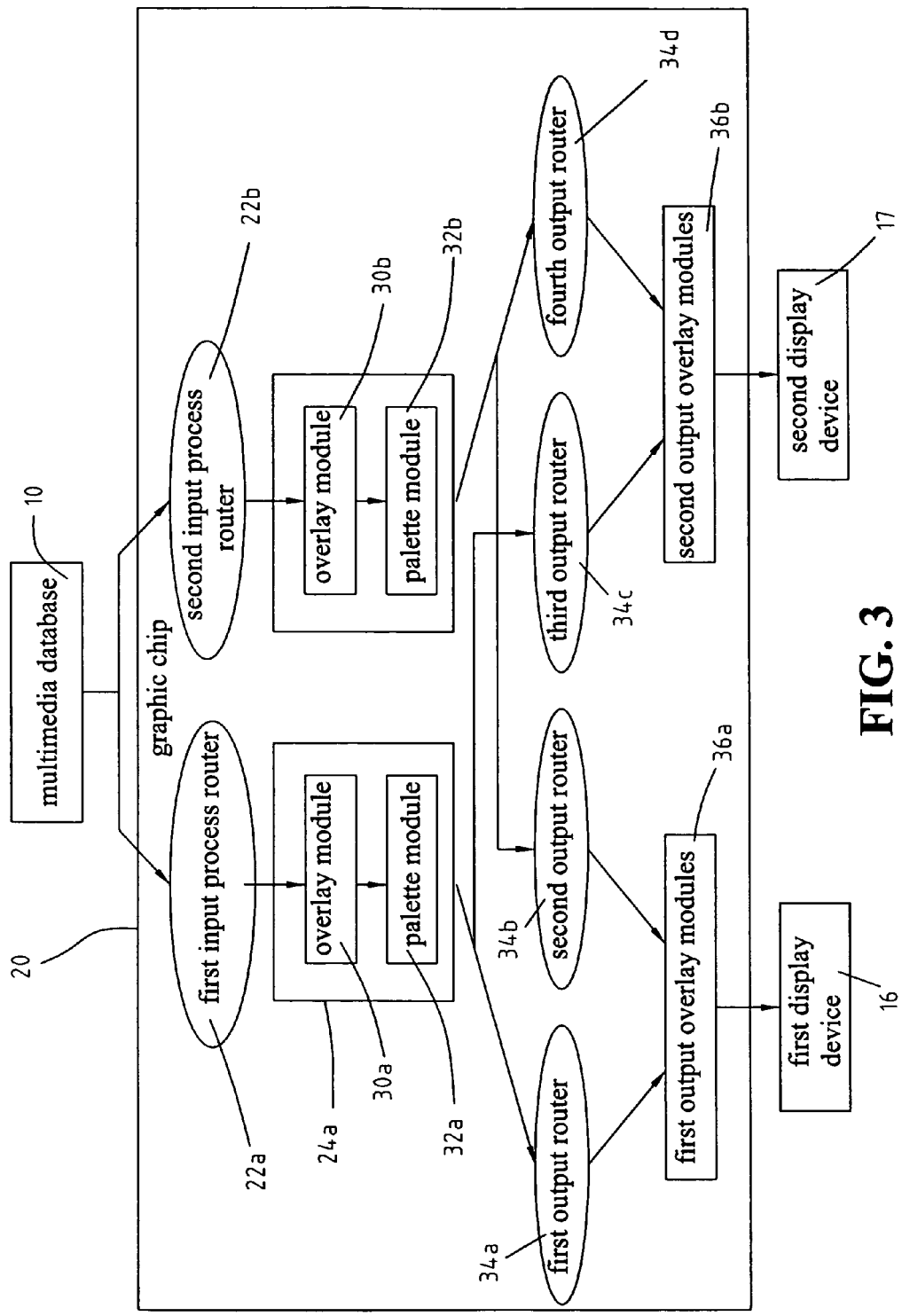
FIG. 3 shows a block diagram of a first embodiment of the present invention.

FIG. 3 shows a block diagram for a first embodiment of the present invention. Referring to FIG. 3, the first graphic processing unit 24a and the second graphic processing unit 24b, further include an overlay module 30a, a palette module 32a, an overlay module 30b, and a palette module 32b, respectively. The overlay module 30a mainly overlays the graphics for the backdrop and the graphics for the moving object racing car and converts it into an index color. The palette module 32a then converts the index color into a physical color which can be actually represented on the first display device 16.

If there is a need to display different graphics on dual display devices 16 and 17 for the live racing car scene and the racing car map, respectively, a first output router 34a selects the processed game backdrop graphics and the moving object graphics and put them onto the first display device 16. A fourth output router 34d selects the processed car racing map graphics as the backdrop graphics and the simplified racing car graphics as the moving object graphics and put them onto the second display device 17. Similarly, if there is need to simultaneously display the same graphics on both display devices 16 and 17, the first output router 34a and a third output router 34c are both activated for displaying the same live racing car scene; while a second output router 34b and the output router four 34d are both activated for displaying the same car racing map graphics.

Furthermore, if there is a need for special effect process on the graphics on display device 16 or on display device 17, the physical colors exported from the palette modules 32a and 32b can be further overlaid by another extra layer of a first output overlay modules 36a and a second output overlay modules 36b, respectively.

Additionally, if there is an external signal source (not illustrated), another fifth output router (not illustrated) can be added to the graphic system just for this external signal. According to the display rule, this fifth output router can selectively export the physical color from the external router onto either the first extra output overlay module 36a or the second extra output overlay module 36b.

In conclusion, the present invention provides a single-chip multi-output graphic system, wherein, by including two sets of graphic processing units (the first graphic processing unit 24a and the second graphic processing unit 24b) within a single graphic chip 20. Within the single graphic chip, there are two input process routers, the fist input process router 22a and the second input process router 22b, which differentiate and distribute the input signals into the appropriate graphic processing units. Similarly, within the single graphic chip, there are another four output routers, the first output router 34a, the second output router 34b, the third output router 34c, and the fourth output router 34d, respectively, which differentiate and distribute the output signals onto the appropriate display units. This thus accomplishes the equivalent dual screen function to display the same or different graphics on two display units with only one graphic chip.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A single-chip multi-output graphic system, comprising:
   a multimedia database, storing multiple backdrop graphics and multiple moving object graphics;
   a first input process router for outputting a first set of backdrop graphics and moving object graphics from said multimedia database determined by a display rule;
   a second input process router for outputting a second set of backdrop graphics and moving object graphics from said multimedia database determined by said display rule;
   a first graphic processing unit, processing said first set of backdrop graphics and moving object graphics and providing output graphics to either a first display unit or a second display unit; and
   a second graphic processing unit, processing said second set of backdrop graphics and moving object graphics and providing output graphics to said first display unit or said second display unit.

2. The single-chip multi-output graphic system as claimed in claim 1, wherein said first graphic processing unit comprises at least:
   an overlay module, overlaying said first set of backdrop graphics and moving object graphics and producing a first index color; and
   a palette module, converting said first index color into a first physical color; and
   wherein said second graphic processing unit comprises at least:
   an overlay module, overlaying said second set of backdrop graphics and moving object graphics and producing a second index color; and
   a palette module, converting said second index color into a second physical color.

3. The single-chip multi-output graphic system as claimed in claim 2, wherein said system further comprises:
   a first output overlay module for overlaying said first physical color and said second physical color and providing output to said first display unit; and
   a first output router, selecting said first physical color from said first graphic processing unit according to said display rule and outputting said first physical color to said first output overlay module.

4. The single-chip multi-output graphic system as claimed in claim 3, wherein said system further comprises:
   a second output router, selecting said second physical color from said second graphic processing unit according to said display rule and outputting said second physical color to said first output overlay module.

5. The single-chip multi-output graphic system as claimed in claim 2, wherein said system further comprises:
   a first output overlay module for overlaying said first physical color and said second physical color and providing output to said first display unit; and
   a second output router, selecting said second physical color from said second graphic processing unit according to said display rule and outputting said second physical color to said first output overlay module.

6. The single-chip multi-output graphic system as claimed in claim 4, wherein said system further comprises:
   a second output overlay module for overlaying said first physical color and said second physical color and providing output to said second display unit; and
   a third output router, selecting said first physical color from said first graphic processing unit according to said display rule and outputting said first physical color to said second output overlay module.

7. The single-chip multi-output graphic system as claimed in claim 6, wherein said system further comprises:
   a fourth output router, selecting said second physical color from said second graphic processing unit according to said display rule and outputting said second physical color to said second output overlay module.

* * * * *